United States Patent
Yanashima et al.

(10) Patent No.: US 6,700,270 B2
(45) Date of Patent: Mar. 2, 2004

(54) SYNCHRONOUS INDUCTION MOTOR

(75) Inventors: Toshihito Yanashima, Ota (JP);
Kazuhiko Arai, Nitta-gun (JP);
Masaaki Takezawa, Nitta-gun (JP);
Keijiro Igarashi, Ota (JP); Eiichi Murata, Isesaki (JP); Masanori Yamashita, Gunma-gun (JP);
Yoshitomo Nakayama, Ota (JP);
Shigemi Koiso, Ota (JP); Noboru Onodera, Ora-gun (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/002,619

(22) Filed: Dec. 5, 2001

(65) Prior Publication Data

US 2002/0140307 A1 Oct. 3, 2002

(30) Foreign Application Priority Data

Jan. 30, 2001 (JP) ........................ 2001-021862

(51) Int. Cl.$^7$ .............................. H02K 21/46
(52) U.S. Cl. .................. 310/156.78; 310/211
(58) Field of Search ............. 310/211, 156.78, 310/156.79, 156.81, 156.82, 156.83, 156.84, 156.56, 156.57

(56) References Cited

U.S. PATENT DOCUMENTS 4,403,161 A  9/1983  Miyashita et al. .......... 310/156

FOREIGN PATENT DOCUMENTS

| DE | 1 203 378 |   | 10/1965 |   |   |
|----|-----------|---|---------|---|---|
| DE | 3429813   | * | 2/1986  | .......... | H02K/21/46 |
| DE | 3522525   | * | 1/1987  | .......... | H02K/19/06 |
| DE | 19951762  | * | 5/2000  | .......... | H02K/21/14 |
| EP | 1 043 827 A2 |   | 10/2000 |   |   |
| GB | 677941    |   | 8/1952  |   |   |
| JP | 7 274460  | * | 10/1995 | .......... | H02K/21/14 |

* cited by examiner

Primary Examiner—Burton Mullins
(74) Attorney, Agent, or Firm—Armstrong, Kratz, Quintos, Hanson & Brooks, LLP

(57) ABSTRACT

A synchronous induction motor realizing a great reluctance torque by concentrating a magnetomotive force generated by a rotor provided with a permanent magnet having a two-pole structure, and having a high efficiency. The synchronous induction motor has a stator provided with a stator winding, a rotor rotating within the stator, a cage-type secondary electric conductor provided in a peripheral portion of a rotor yoke portion constituting the rotor, and a permanent magnet inserted into the rotor yoke portion and having a two-pole structure, and the magnetomotive force generated by one pole of the rotor is set to a value equal to or less than 10% of a peak value in a predetermined range near an electrical angle of 0 degrees or 180 degrees.

5 Claims, 7 Drawing Sheets

SYNCHRONOUS INDUCTION MOTOR

BACKGROUND OF THE INVENTION

Field of the Invention

The present invention relates to a synchronous induction motor provided with a permanent magnet having a two-pole structure inserted into a rotor yoke portion.

Conventionally, for example, in a refrigerator (an electric refrigerator), an air conditioner (an air conditioning device) and the like, an enclosed type electric compressor constituting a refrigerating cycle of a cooling apparatus thereof is mounted. Furthermore, as an electrically driven element for driving the compressor, there has been employed an induction motor or a DC brushless motor driven by a single phase or three phase commercial power source.

However, in the case of taking an efficiency together with an energy regulation in recent days or the like into consideration, an operation efficiency of the motor used in the enclosed type electric compressor constituting the refrigerant cycle of the refrigerator, the air conditioner or the like does not always have high efficiency. On the contrary, it is said that it is effective to use the DC brushless motor in view of the high efficiency, however, the DC brushless motor requires a drive circuit, so that there is a problem of generating an increase of cost. Accordingly, it is desired to develop a motor which can be operated from a start by a commercial power source and has a high efficiency.

SUMMARY OF THE INVENTION

The present invention is made so as to solve the problems of the prior art mentioned above, and an object of the present invention is to provide a synchronous induction motor realizing a great reluctance torque by concentrating a magnetomotive force generated by a rotor provided with a permanent magnet having a two-pole structure, and having a high efficiency.

That is, in accordance with the present invention, there is provided a synchronous induction motor comprises a stator provided with a stator winding, a rotor rotating within the stator, a cage-type secondary electric conductor provided in a peripheral portion of a rotor yoke portion constituting the rotor and a permanent magnet inserted into the rotor yoke portion and having a two-pole structure, wherein the magnetomotive force generated by one pole of the rotor is set to a value equal to or less than 10% of a peak value in a predetermined range near an electrical angle 0 degrees or 180 degrees.

Further, in accordance with the present invention, there is provided a synchronous induction motor as described above, wherein the range equal to or less than 10% is set to electrical angles 0–10 degrees and 170–180 degrees.

Further, in accordance with the present invention, there is provided a synchronous induction motor as described in each of the inventions mentioned above, wherein the magnetomotive forces generated by the rotor in a range of the electrical angle other than the range equal to or less than 10% are distributed in a sine wave shape.

Further, in accordance with the present invention, there is provided a synchronous induction motor as described in each of the inventions mentioned above, wherein the magnetomotive forces generated by the rotor in a range of the electrical angle than the range equal to or less than 10% are distributed in a step-like chevron shape having two or more steps.

Further, in accordance with the present invention, there is provided a synchronous induction motor as described in each of the inventions mentioned above, wherein the synchronous induction motor is mounted on a compressor.

Further, in accordance with the present invention, there is provided a synchronous induction motor as described above, wherein the compressor is used in an air conditioning device or an electric refrigerator.

In accordance with the present invention, because in the synchronous induction motor having a stator provided with a stator winding, a rotor rotating within the stator, a cage-type secondary electric conductor provided in a peripheral portion of a rotor yoke portion constituting the rotor and a permanent magnet inserted into the rotor yoke portion and having a two-pole structure, the magnetomotive force generated by one pole of the rotor is set to a value equal to or less than 10% of a peak value in a predetermined range near an electrical angle of 0 degrees or 180 degrees, it is possible to concentrate the magnetomotive force generated by the rotor to a range between 10 degrees and 170 degrees which corresponds to a range other than the electrical angles 0–10 degrees and 170–180 degrees by setting the range equal to or less than 10% the electrical angles 0–10 degrees and 170–180 degrees. Accordingly, because it is possible to secure a great reluctance torque, it is possible to achieve a high efficiency and a high torque of the synchronous induction motor.

Further, in accordance with the present invention, because the magnetomotive forces generated by the rotor in a range of the electrical angle other than the range equal to or less than 10% are distributed in a sine wave shape, it is possible to smoothly rotate the rotor. Accordingly, it is possible to make good use of a reluctance torque.

Further, in accordance with the present invention, since the magnetomotive forces generated by the rotor in a range of the electrical angle other than the range equal to or less than 10% are distributed in a step-like chevron shape having two or more steps, it is possible to make the magnetomotive force generated by the rotor having the permanent magnet having the two-pole structure inserted into the rotor yoke portion similar to a sine wave. Accordingly, it is possible to achieve a high efficiency and a high torque without largely deteriorating an effect of the magnetomotive force generated by the rotor.

In particular, if the generated magnetomotive force is, for example, formed in the shape distributed in a step-like chevron shape having two or more steps, it is possible to further improve an effectiveness of a high efficiency and a high torque.

Further, in accordance with the present invention, because the synchronous induction motor mentioned above is mounted on the compressor, it is possible to realize a low energy structure, for example, by using the compressor in the air conditioning device or the electric refrigerator. Accordingly, it is possible to develop a commercial product, for example, corresponding to a recent energy regulation or the like.

DETAILED DESCRIPTION OF THE PREFERRED EMBODIMENTS

Figure 1:
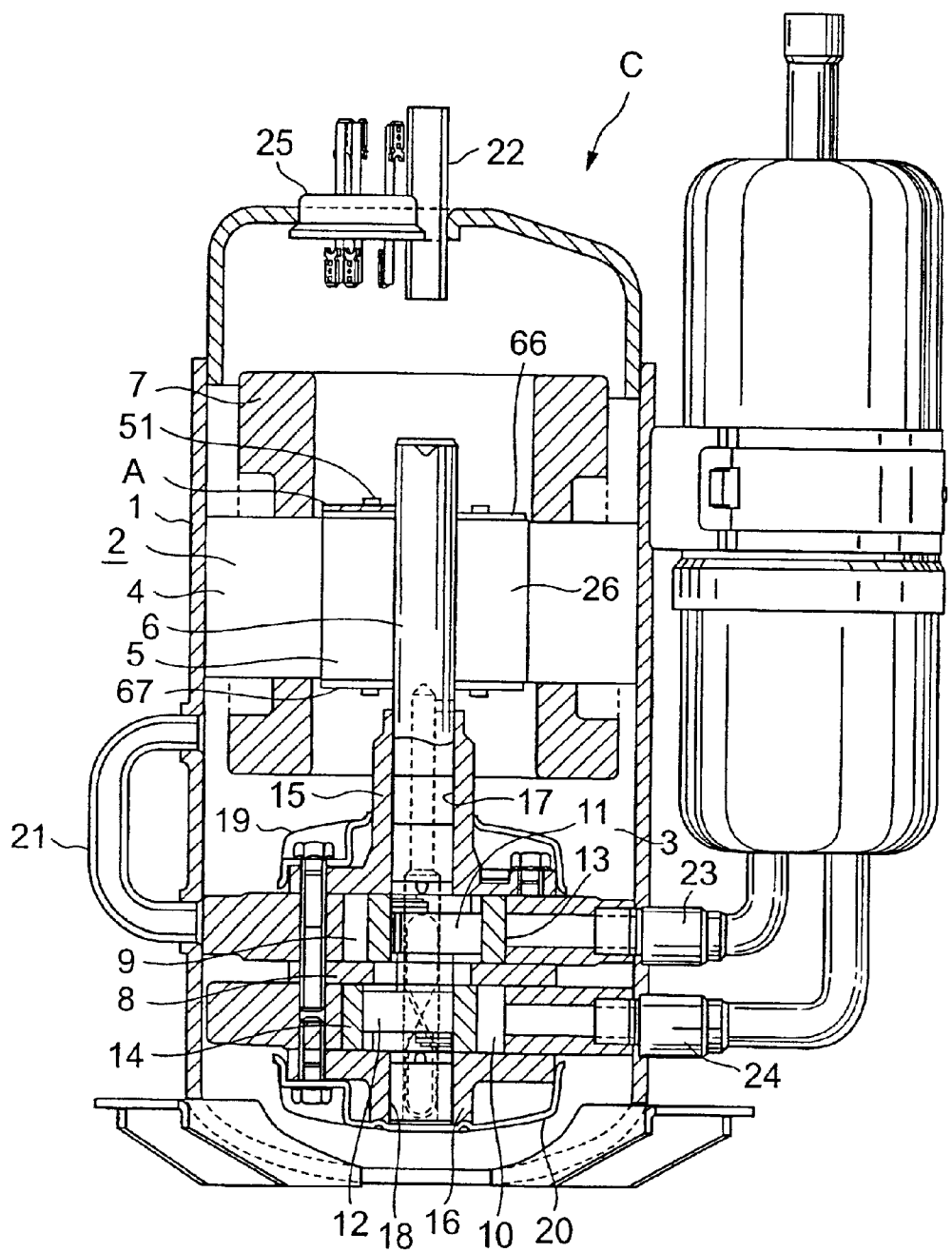
FIG. 1 is a vertical cross sectional side view of an enclosed type electrically driven compressor C to which a synchronous induction motor is applied.
Figure 2:
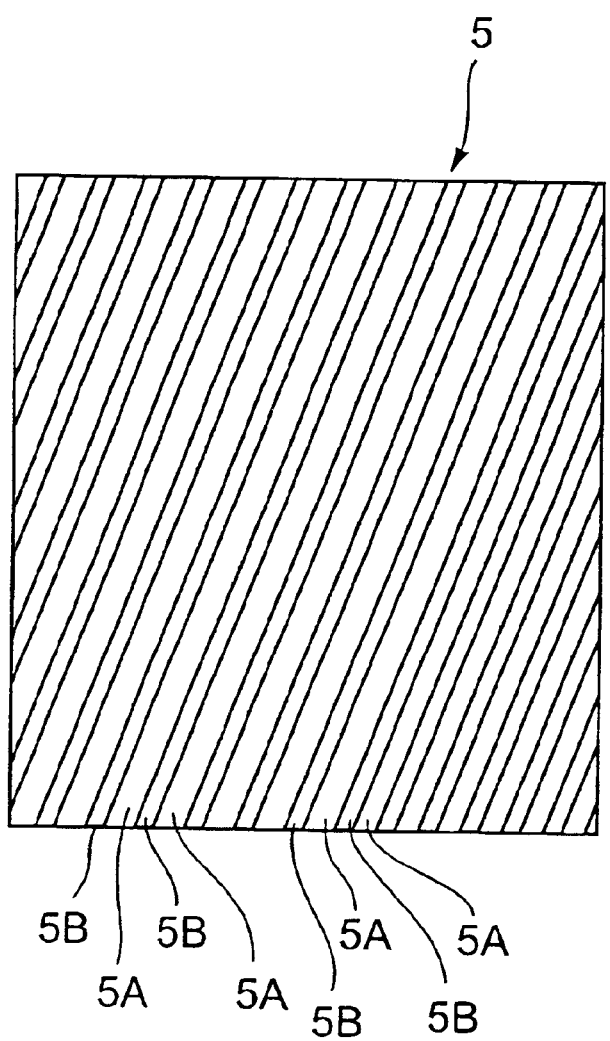
FIG. 2 is a plan view of a rotor shown in FIG. 1.
Figure 3:
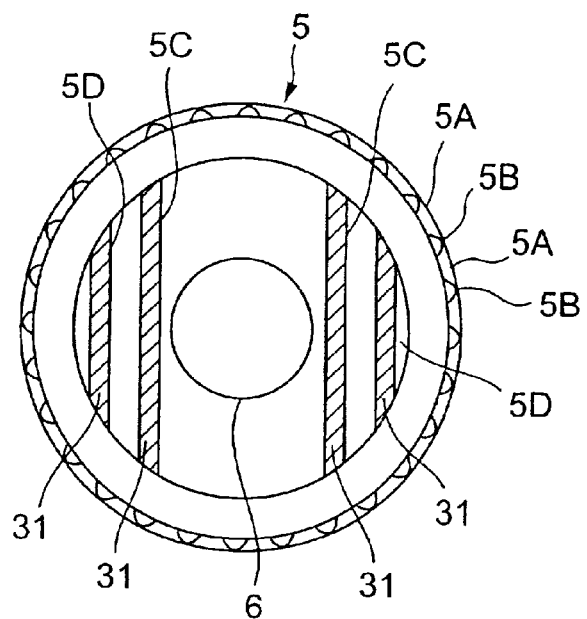
FIG. 3 is a horizontal cross sectional top view of the rotor shown in FIG. 1.
Figure 4:
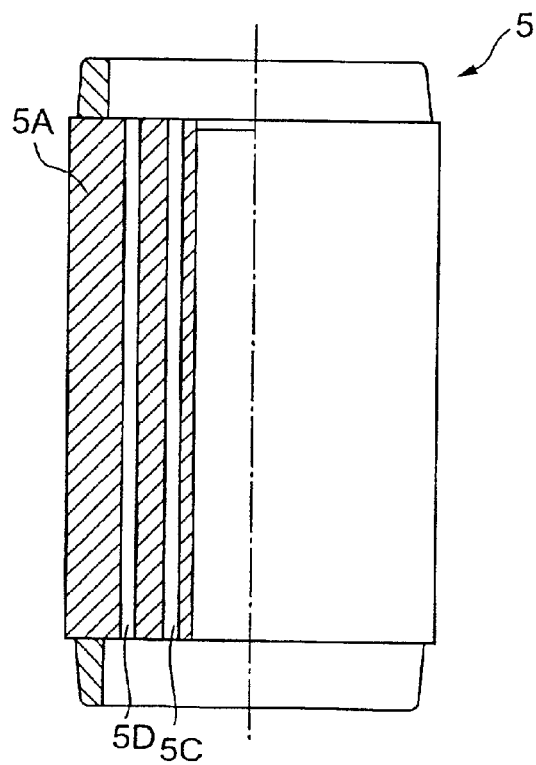
FIG. 4 is a vertical cross sectional side view of the rotor shown in FIG. 1.

Next, a detailed description will be provided of an embodiment in accordance with the present invention with reference to the accompanying drawings. In each of the drawings, reference numeral 1 denotes a sealed vessel. A synchronous induction motor 2 is received in an upper side within the sealed vessel 1, and a compressor 3 rotated by the synchronous induction motor 2 is received in a lower side within the sealed vessel 1. The sealed vessel 1 is structured such as to be previously separated into two sections, receive the synchronous induction motor 2 and the compressor 3 therein and be sealed by a high-frequency welding or the like. In this case, as an enclosed type electrically driven compressor C, there are listed up a rotor compressor, a reciprocal compressor, a scroll compressor and the like.

The synchronous induction motor 2 is constituted by a stator 4 made by a single-phase two-pole structure and fixed to an inner wall of the sealed vessel 1, and a rotor 5 supported to an inner side of the stator 4 so as to freely rotate around a rotary shaft 6. Further, the stator 4 is provided with a stator coil 7 applying a rotary magnetic field to the rotor 5.

The compressor 3 is provided with a first rotary cylinder 9 and a second rotary cylinder 10 which are sectioned by an intermediate partition plate 8. Eccentric portions 11 and 12 rotated by the rotary shaft 6 are mounted to the respective cylinders 9 and 10, and the eccentric portions 11 and 12 are shifted in phase to each other at 180 degrees.

Reference numeral 13 and 14 denote a first roller and a second roller respectively rotating within the cylinders 9 and 10. The first roller 13 and the second roller 14 respectively rotate within the cylinders due to rotation of the eccentric portions 11 and 12. Reference numerals 15 and 16 respectively denote a first frame body and a second frame body. The first frame body 15 forms a closed compression space between the first frame body 15 and the intermediate partition plate 8, and the second frame body 16 forms a closed compression space of the cylinder 10 between the second frame body 16 and the intermediate partition plate 8 in the same manner. Further, the first frame body 15 and the second frame body 16 are respectively provided with bearing portions 17 and 18 rotatably pivoting a lower portion of the rotary shaft 6.

Reference numerals 19 and 20 denote a discharge muffler. These discharge mufflers 19 and 20 are respectively mounted so as to cover the first frame body 15 and the second frame body 16. In this case, the cylinder 9 and the discharge muffler 19 are communicated with each other by a discharge hole (not shown) provided in the first frame body 15, and the cylinder 10 and the discharge muffler 20 are also communicated with each other by a discharge hole (not shown) provided in the second frame body 16. Reference numeral 21 denotes a bypass pipe provided in an outer portion of the sealed vessel 1. The bypass pipe 21 is communicated with an inner portion of the discharge muffler 20.

Further, reference numeral 22 denotes a discharge pipe provided on the sealed vessel 1, and reference numerals 23 and 24 respectively denote suction pipes connected to the cylinders 9 and 10. Further, reference numeral 25 denotes a sealed terminal. The sealed terminal 25 is structured so as to supply an electric power to the stator coil 7 of the stator 4 from an external portion of the sealed vessel 1 (a lead wire connecting the sealed terminal 25 to the stator coil 7 is not illustrated).

Further, reference numeral 26 denotes a rotor iron core. The rotor iron core 26 is structured such that a plurality of rotor steel plates obtained by punching an electromagnetic steel plate having a thickness between 0.3 mm and 0.7 mm (not shown) in a predetermined shape are laminated and are caulked with each other so as to be integrally laminated (in this case, it is possible to integrally form in accordance with a welding in place of the caulking). Reference numerals 66 and 67 denote flat end surface members mounted to upper and lower ends of the rotary iron core 26. The flat end surface members 66 and 67 are formed substantially in the same shape as that of the rotor iron plate by a non-magnetic material such as an aluminum, a resin material or the like. Reference numeral A denotes a balance weight. The balance weight A is fixed to the rotor iron core 26 together with the upper end surface member 66 by a rivet 51.

The rotor 5 is constituted by a rotor yoke portion 5A, a cage-type secondary electric conductor 5B provided in a peripheral portion of the rotary yoke portion 5A, and a permanent magnet 31 inserted to the rotor yoke portion 5A. A plurality of cage-type secondary electric conductors 5B are provided in the peripheral portion of the rotor yoke portion 5A, and an aluminum die casting is injection molded in a cylindrical hole (not shown) formed in a cage shape around an extending direction of the rotary shaft 6. Both ends of the cage-type secondary conductor 5B are formed in a so-called skewed structure which is inclined in a spiral shape having a predetermined angle in a circumferential direction of the rotary shaft 6.

Further, engagement holes 5C and 5D are provided in the rotor yoke portion 5A so as to be in parallel and to oppose both sides of the rotary shaft 6, and the engagement holes 5C and 5D are formed from one end of the rotor yoke portion 5A to the other end. Each of the engagement holes 5C and 5C and the engagement holes 5D and 5D is formed so as to engage with the permanent magnet 31 mentioned below, the engagement holes 5C and 5C are provided close to the rotary shaft 6, and the engagement holes 5D and 5D are provided in an apart side of the rotary shaft 6 with a predetermined interval. That is, the engagement holes 5C and 5C formed in the rotor yoke portion 5A are positioned in a side of the rotary shaft 6, the engagement holes 5D and 5D are positioned in an apart side of the rotary shaft 6 on the basis of the engagement holes 5C and 5C, and a width of the engagement holes 5C and 5C is formed so as to be wider than a width of the engagement holes 5D and 5D.

The permanent magnet 31 is inserted to each of the engagement holes 5C and 5C and the engagement holes 5D and 5D, and the permanent magnet 31 is formed in a plate shape having a predetermined thickness and is inserted from one end of the rotor yoke portion 5A to another end. Further, permanent magnets 31SA and 31NA having a large width are respectively inserted to both of the engagement holes 5C and 5D formed in the rotor yoke portion 5A, and permanent magnets 31SB and 31NB having a small width are respectively inserted to both of the engagement holes 5D and 5D. In this case, a center in a width direction of each of the permanent magnets 31, . . . is arranged on a straight line vertically crossing a center of the rotary shaft 6. Further, each of the permanent magnets 31, . . . employs a rare earth magnet having a largest magnetic flux density.

Figure 7:
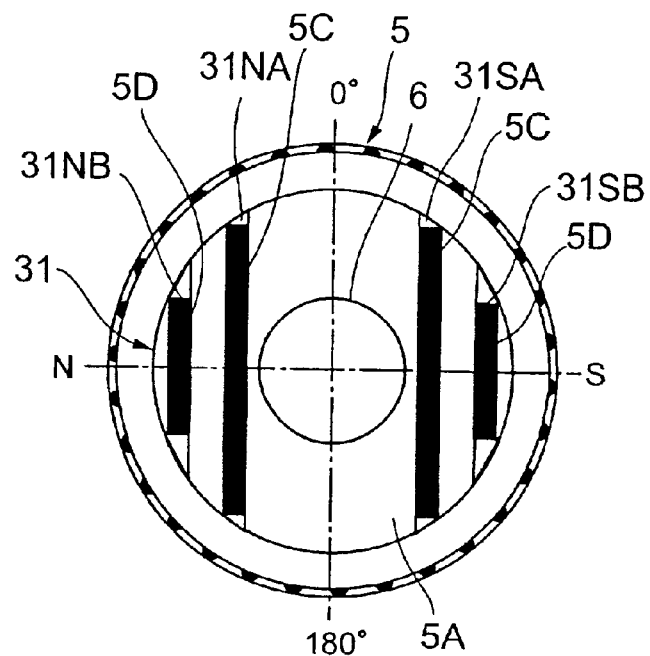
FIG. 7 is a horizontal cross sectional top view of a rotor in accordance with the present invention.

Further, the permanent magnets 31SA and 31SB and the permanent magnets 31NA and 31NB provided so as to oppose to the rotary shaft 6 are inserted with different magnetic poles. In this case, the permanent magnets 31SA and 31SB inserted to one side (a right side in the drawing) of the rotary shaft 6 are respectively set to the same S pole, and the permanent magnets 31NA and 31NB inserted to another side (a left side in the drawing) are respectively set to the same N pole (FIG. 7). That is, the permanent magnets 31SA and 31SB and the permanent magnets 31NA and 31NB are inserted toward an outer side in a circumferential direction of the rotor 5 respectively in a two-pole structure comprising the different S pole and N pole, and are structured such as to apply a rotational force to the rotor 5 by lines of magnetic force of a main coil 7A and an auxiliary coil 7B mentioned below.

Figure 5:
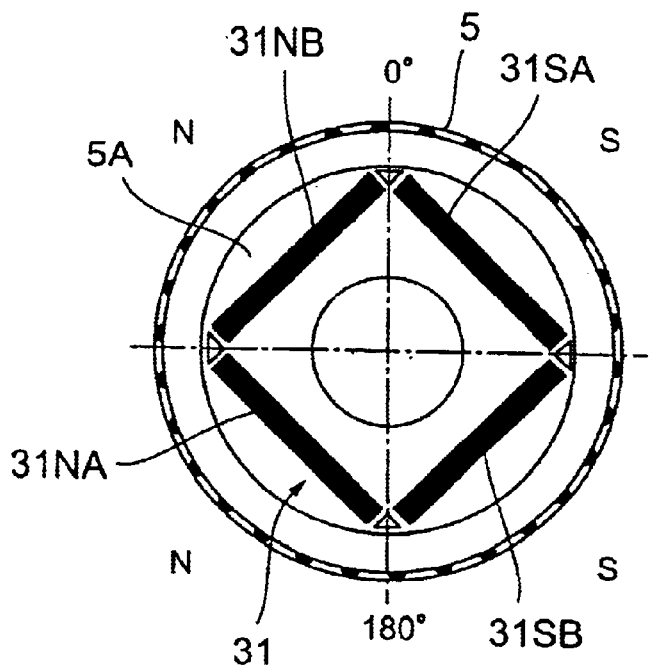
FIG. 5 is a horizontal cross sectional top view of the rotor.
Figure 6:
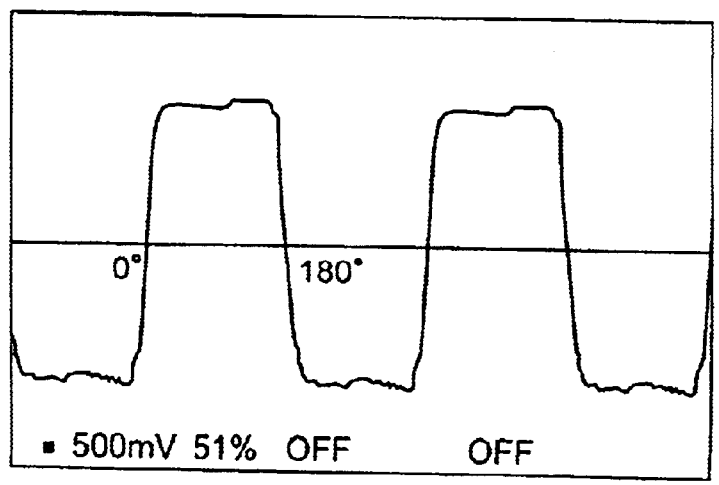
FIG. 6 is a view showing a magnetomotive force generated by the rotor.

In this case, FIGS. 5 and 6 respectively show a structure of a rotor to which the permanent magnet having the two-pole structure is inserted, and a magnetomotive force generated thereby. In FIG. 5, reference numeral 5 denotes a rotor, and reference numeral 31 denotes a permanent magnet. The rotor 5 is provided with the permanent magnet 31 having the two-pole structure having the S pole in one side (the permanent magnets 31SA and 31SB in a right side in the drawing) and the N pole in another side (the permanent magnets 31NA and 31NB in a left side in the drawing). The permanent magnets 31SA and 31SB and the permanent magnets 31NA and 31NB are respectively inserted to the rotor yoke portion 5A in a state of being substantially closely attached to each other, and the S pole and the N pole of the permanent magnet 31 (the permanent magnets 31SA and the permanent magnet 31NB, and the permanent magnet 31SB and the permanent magnet 31NA) are also inserted to the rotor yoke portion 5A in a state of being substantially closely attached to each other. FIG. 6 is a view showing the magnetomotive force generated by the rotor 5 (in this case, the generated magnetomotive force is detected at a predetermined position of the rotor 5 (in this case, a position of an electrical angle 0 degree in FIG. 5). In this case, in FIG. 6, a vertical axis shows a generated magnetomotive force and a horizontal axis shows an angle of rotation of the rotor 5. Further, the generated magnetomotive force at a position at which the S pole and the N pole are balanced in a boundary between the S pole and the N pole (the positions having the electrical angle 0 degree and 180 degrees) becomes 0 magnetomotive force.

Further, when rotating the rotor 5 in a clockwise direction, the magnetomotive force generated by the permanent magnet 31NB is detected (in this case, the generated magnetomotive force directed to an upper portion in the drawing is detected). In accordance with further rotating the rotor 5, the generated magnetomotive force becomes increased, and the generated magnetomotive force becomes a peak and the state is kept for a fixed angle of rotation (the magnetomotive force generated by the permanent magnet 31NB and the permanent magnet 31NA). Further, when further rotating the rotor 5 and moving close to the permanent magnet 31SB (the position of the electrical angle 180 degrees of the rotor 5 in which the S pole and the N pole are balanced), the generated magnetomotive force of the S pole (the permanent magnet 31SB) is going to be small. Further, the generated magnetomotive force of the S pole (the permanent magnet 31SB) is detected at the same time when the electrical angle of the rotor 5 is over 180 degrees (in this case, the generated magnetomotive force directed to a lower portion in the drawing is detected). In accordance with further rotating the rotor 5, the generated magnetomotive force is going to be increased in a minus direction, so that the generated magnetomotive force becomes a peak and the state is kept for a fixed angle of rotation (the magnetomotive force generated by the permanent magnet 31SB and the permanent magnet 31SA).

Further, when further rotating the rotor 5 so as to move close to the permanent magnet 31SA of the S pole (the position of the electrical angle 0 degree in which the S pole and the N pole are balanced), the magnetomotive force generated by the permanent magnet 31NB in the N pole is going to be reduced. Further, the electrical angle of the rotor 5 is over the position 0 degree (360 degrees), the magnetomotive force generated by the N pole (the permanent magnet 31NB) is detected in the same manner as that mentioned above, and this operation is repeated. That is, the rotor 5 generates the magnetomotive force formed in a substantially rectangular shape in which the generated magnetomotive force in the S pole and the generated magnetomotive force in the N pole are continuously formed.

In the case of using the synchronous induction motor having the two-pole structure, since the S pole and the N pole are adjacent to each other, an interval between the generated magnetomotive forces having the different electrical angles is substantially continuous as is known from FIG. 6 and no gap exists. Accordingly, the driving force is applied to the rotor 5 in a reverse direction due to the generated magnetomotive forces of the adjacent different permanent magnets, and an output property (a pullout torque) is reduced, so that it is impossible to secure a large reluctance torque. Accordingly, it is required to further improve a high efficiency of a commercial power source drive by using the synchronous induction motor having the two-pole structure.

Figure 8:
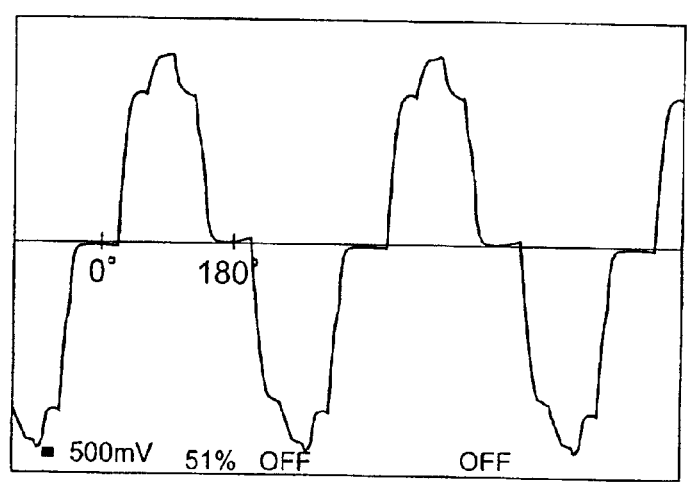
FIG. 8 is a view showing a magnetomotive force generated by the rotor in accordance with the present invention.

Accordingly, a description will be given next of a synchronous induction motor having a two-pole structure intending to increase an efficiency. FIG. 8 shows a magnetomotive force generated by the rotor 5 to which the permanent magnet 31 having the two-pole structure is inserted. Further, reference symbol S in a-right side in FIG. 7 denotes the S pole of the permanent magnets 31SA and 31SB, and reference symbol N in a left side denotes the N pole of the permanent magnets 31NA and 31NB. FIG. 8 shows a generated magnetomotive force detected at a predetermined position (in this case, a position having an electrical angle 0 degree in FIG. 7) of the rotor 5. In this case, in the drawing, a vertical axis shows the generated magnetomotive force, and a horizontal axis shows an angle of rotation. When rotating the rotor 5 in a clockwise direction, the generated magnetomotive force is not detected until the permanent magnet 31NA reaches the position having the electrical angle 0 degree, and a state that the generated magnetomotive force is not detected is kept until the permanent magnet 31NA reaches the electrical angle 0 degree (in this case, the electrical angle of the rotor 5 is about 10 degrees).

Further, when the permanent magnet 31NA reaches the position having the electrical angle 0 degree, the generated magnetomotive force is detected (in this case, the generated magnetomotive force is shown in an upper portion of the drawing). In accordance with further rotating the rotor 5, the generated magnetomotive force is going to be increased, and when the permanent magnet 31NA moves close to the electrical angle 0 degree in parallel, the generated magnetomotive force becomes a peak and the state is kept for a fixed angle of rotation. Further, when further rotating the rotor 5, the permanent magnet 31NB reaches the position of the electrical angle 0 degree in this case and the generated magnetomotive force of the permanent magnet 31NB is detected, and thereafter, the generated magnetomotive force is further increased, and when the permanent magnet 31NB moves close to the position having the electrical angle 0 degree in parallel, the generated magnetomotive force becomes a peak and the state is kept for a fixed angle of rotation.

Further, the generated magnetomotive force in which the electrical angle of the rotor 5 is until 90 degrees to 180 degrees becomes a generated magnetomotive force until an electrical angle 90 degrees to 0 degree reverse to the generated magnetomotive force until the electrical angle 0 degree to 90 degrees mentioned above. Further, in the generated magnetomotive force from the electrical angle 180 degrees of the rotor 5 to 360 degrees (0 degree), since a polarity of the permanent magnets 31SA and 31SB inserted to another side of the rotor 5 becomes the S pole, the generated magnetomotive force is generated in an opposite side to the generated magnetomotive force in the N pole side (the electrical angle 0 degree to 180 degrees) (the generated magnetomotive force in this case is detected in a lower side in the drawing).

On the contrary, since the generated magnetomotive force in the case of only inserting the permanent magnets 31SA and 31NA to the engagement hole 5C without inserting the permanent magnets 31SB and 31NB to the engagement hole 5D is formed in a shape in which a predetermined rotational angle portion of the rotor 5 becomes flat (a rectangular wave shape) due to no magnetomotive force generated by the permanent magnets 31SB and 31NB, in addition that the permanent magnets 31SA and 31SB and the permanent magnets 31NA and 31NB are arranged at a predetermined interval, the permanent magnets 31SB and 31NB are structured such as to be narrower than the permanent magnets 31SA and 31NA. Accordingly, the magnetomotive force generated by the permanent magnets 31SB and 31NB is overlapped with the flat portion of the magnetomotive force generated by the permanent magnets 31SA and 31NA due to the rotation of the rotor 5 so as to form two stages and be distributed in a stepped chevron shape having two stages, thereby being made similar to a generated magnetomotive force having an ideal sine wave shape.

Figure 9:
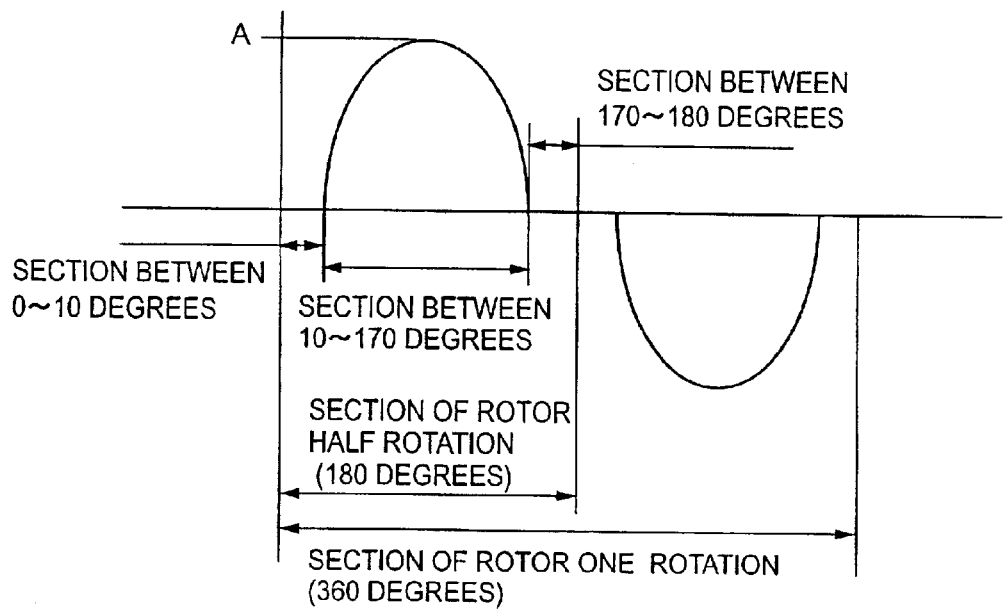
FIG. 9 is a schematic view describing an ideal magnetomotive force generated by a synchronous induction motor provided with a permanent magnet having a two-pole structure.

Next, a description will be given of an ideal generated magnetomotive force of the synchronous induction motor provided with the permanent magnet having the two-pole structure with reference to FIG. 9. In the case of the synchronous induction motor provided with the permanent magnet having the two-pole structure, the generated magnetomotive force is ideally structured such that no generated magnetomotive force exists in sections of the electrical angles of the rotor 5 between 0 degree and 10 degrees and between 170 degrees and 180 degrees, and in a section of the electrical angle between 10 degrees and 170 degrees, the sine wave in which a magnitude of the generated magnetomotive force in an upward direction becomes a peak (a position of a line A in the drawing) at a time when the electromagnetic angle of the rotor 5 is 90 degrees is formed (in this case, the N pole side). Further, the generated magnetomotive force is ideally structured such that in the S pole side, no generated magnetomotive force exists in sections of the electrical angles of the rotor 5 between 180 degrees and 190 degrees and between 350 degrees and 360 degrees, and in a section of the electrical angle between 190 degrees and 350 degrees, the sine wave in which a magnitude of the generated magnetomotive force in a downward direction becomes a peak at a time when the electromagnetic angle of the rotor 5 is 270 degrees is formed.

In this case, since the generated magnetomotive force does not exist between the sections of the electrical angle of the rotor 5 between 0 degree and 10 degrees and between 170 degrees and 180 degrees, and the generated magnetomotive force waveform distribution of the rotor 5 in the sections of the electrical angles between 10 degrees and 170 degrees and between 190 degrees and 350 degrees is formed in the sine wave shape, it is possible to effectively make good use of the reluctance so as to restrict a rotational torque unevenness of the rotor 5. Accordingly, since it is possible to smoothly rotate the synchronous induction motor, it is possible to achieve a high efficiency and a high torque. That is, in accordance with the present invention, the permanent magnets 31SA and 31SB and the permanent magnets 31NA and 31NB are arranged in the rotor 5 at a predetermined interval and the permanent magnets 31SB and 31NB are structured such as to be narrower than the permanent magnets 31SA and 31NA, whereby the magnetomotive force generated by the rotor 5 is distributed in the stepped chevron shape having the two stages similar to the sine wave. Accordingly, it is possible to form the ideal generated magnetomotive force of the synchronous induction motor.

Comparing the synchronous induction motor 2 having the structure mentioned above with the conventional synchronous induction motor, the following Table 1 is obtained.

| COMPARATIVE DATA | | |
|---|---|---|
| | CONVENTIONAL SHAPE | SHAPE OF PRESENT INVENTION |
| POWER SOURCE [Hz-v] | 60 Hz-230 V | 60 Hz-230 V |
| OPERATION TORQUE [Nm] | 3.4 | 3.4 |
| INPUT [W] | 1466 | 1418(Δ48 W) |
| EFFICIENCY [%] | 87.4 | 90.4(+3%) |
| PULLOUT TORQUE [Nm] | 4.9 | 6.6(+34.7%) |
| TOTAL FLUX AMOUNT [%] | 100 | 91 |

\* Measure only the pullout torque mentioned above in 60 Hz-208 V.
\* Total flux amount: describe a value on the assumption that the conventional shape is set to 100.

It is generally said that when an area of a generated magnetomotive force (an amount of flux) is great, an operation performance (an operation efficiency) and an output property (a pullout torque) are improved. In accordance with Table 1, in the case of the same power source 60 Hz/230 V and operation torque 3.4 Nm, the input of the present invention is 1418 W lower than 1466 W in the conventional one, and the efficiency of the present invention is 90.4% better than 87.4% in the conventional one. Further, the pullout torque (the peak torque) is 6.6 Nm better than 4.9 Nm in the conventional one, and the total flux amount of the present invention is 91% with respect to 100% in the conventional one. As is known from the table, the shape of the generated magnetomotive force in accordance with the present invention in which the total flux amount is small has a great and excellent property in both of the operation efficiency and the output property.

Accordingly, it is known that the operation property of the synchronous induction motor 2 is improved because the shape of the magnetomotive force generated by the rotor 5 from the stator 4 side is formed in a substantially sine wave shape (distributed in the step manner). Further, it is known that the output property (the pullout torque) is obtained because the generated magnetomotive force does not exist (exists a little) in the sections of the electrical angle between 0 degree and 10 degrees and between 170 degrees and 180 degrees, in the distribution of the generated magnetomotive force corresponding to one pole of the rotor 5, and the section of the rotational angle largely contribute to improve the reluctance, thereby largely increasing the output property (the pullout torque).

As mentioned above, it is possible to largely improve the operation property and the output property by taking the arrangement of the permanent magnet 31 and the like into consideration, even when the total flux amount is small. Further, in the case of reducing the total flux amount, since it is possible to make the permanent magnet 31 inserted to the rotor 5 small, it is possible to reduce a cost.

Figure 10:
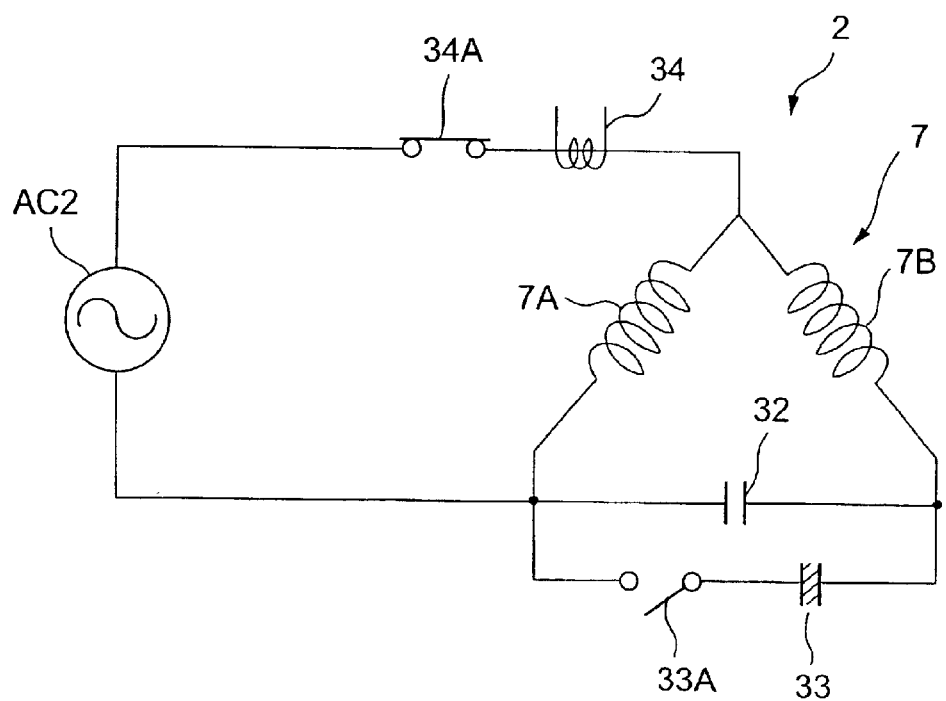
FIG. 10 is a view of an electric circuit of a synchronous induction motor of a single-phase two-pole type.

On the contrary, FIG. 10 shows an electric circuit diagram of the synchronous induction motor 2 of a single-phase two-pole. In FIG. 10, the synchronous induction motor 2 is provided with the stator coil 7 comprising the main coil 7A and the auxiliary coil 7B. A series circuit constituted by an operation condenser 32 connected in series, a start condenser 33 and a start switch 33A which are connected in parallel to the operation condenser 32 is connected to one of the auxiliary coil 7B. In this case, reference numeral 34 denotes an electric current sensing type line electric current detector, reference numeral 34A denotes a protecting switch shutting a power supply to the stator coil 7 in the case that a previously set predetermined electric current is detected by the line electric current detector 34, and reference symbol AC2 denotes a single-phase alternating commercial power source.

On the basis of the structure mentioned above, a description will be given next of an operation of the synchronous induction motor 2. In this case, it is assumed that the start switch 33A is closed in a state that the synchronous induction motor 2 stops. Further, when the power switch (the protecting switch 34A) is closed, the electric current starts flowing to the main coil 7A and the auxiliary coil 7B from the single-phase alternating commercial power source AC2, and since the parallel circuit constituted by the start condenser 33 and the operation condenser 32 is connected to the auxiliary coil 7B, the rotor 5 starts in a predetermined rotating direction due to an application of a desired start torque.

At this time, since the generated magnetomotive force distributed in the stepped chevron shape having two stages similar to the sine wave is formed in the rotor 5, the rotor 5 reacts to the electric current flowing to the stator coil 7 and a start operation of the synchronous induction motor 2 is executed. Further, when a rotational speed of the rotor 5 is increased to a predetermined rotational number (in this case, about 80% of a synchronous rotational number), the start switch 33A is opened, the start condenser 33 is broken out from the circuit, and the synchronous induction motor 2 is operated only by the operation condenser 32. Accordingly, at a time of operating the synchronous induction motor 2 after a starting time immediately when the power source switch 34A is closed until the synchronous operation is executed, it is possible to drive at a high efficiency and a high torque due to the generated magnetomotive force similar to the sine wave of the stepped chevron shape applied by the permanent magnet 31.

In the above embodiment, the generated magnetomotive force does not exist between the sections of the electrical angle of the rotor 5 between 0 degree and 10 degrees and between 170 degrees and 180 degrees. But the above effects can be obtained in case of the value of the generated magnetmotive force is equal to or less than 10% of the peak value in the above range of the electrical angle.

As mentioned above, the generated magnetomotive force corresponding to one pole of the permanent magnet 31 inserted to the rotor 5 is concentrated in the sine wave shape by being set to be equal to or less than 10% of the peak value in the electrical angle between 0 degree and 10 degrees and between 170 degrees and 180 degrees and being distributed in the step shape in the electrical angle between 10 degrees and 170 degrees. Accordingly, it is possible to effectively make good use of the reluctance torque so as to restrict the rotational torque unevenness of the rotor 5, and it is possible to largely increase a preferable output property (pullout torque). Therefore, it is possible to operate the synchronous induction motor 2 at a high efficiency and at a high torque.

Further, because the cage-type secondary electric conductor 5B of the rotor 5 is made in the skewed structure, it is possible to easily execute a self start by the single-phase power source in the same manner as that of the conventional synchronous induction motor. Accordingly, it is possible to easily execute a self start of the synchronous induction motor 2 even by the single-phase power source. Further, since the permanent magnet 31 is set to the rare earth magnet, it is possible to significantly increase the magnetic flux density of the permanent magnet 3.

When mounting the synchronous induction motor 2 having the structure mentioned above to the compressor of the air conditioner, the electric refrigerator or the like, it is possible to achieve a widely low energy structure and it is possible to reduce a cost. Accordingly, it is possible to develop a commercial product corresponding to the energy regulation or the like.

Figure 11:
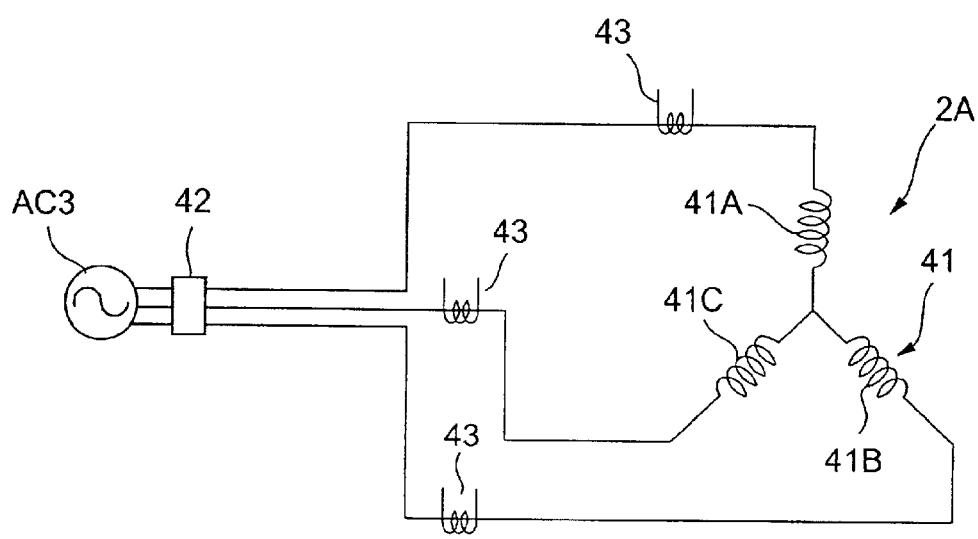
FIG. 11 is a view of an electric circuit of a synchronous induction motor of a three-phase two-pole type.

Next, FIG. 11 shows an electric circuit diagram of the synchronous induction motor 2A having three phases and two poles. In FIG. 11, a synchronous induction motor 2A is provided with a three-phase stator coil 41 constituted by a coil 41A, a coil 41B and a coil 41C. Each of the coil 41A, the coil 41B and the coil 41C of the stator coil 41 is connected to a three-phase alternating commercial power source AC3 via a power source switch 42. In this case, reference numeral 43 denotes an electric current sensing type line electric current detector for detecting a line electric current. The line electric current detector 43 is provided in each of wires connected to the respective coils 41A, 41B and 41C, further, the power source switch 42 commonly serves as a protecting switch for shutting off the power supply to the stator coil 7 in the case of sensing a previously set predetermined electric current by the line electric current detector 43.

Next, a description will be given of an operation of the synchronous induction motor 2. When the power switch 42 is closed, the three-phase electric current flows through the coils 41A, 41B and 41C and the rotor 5 starts in a predetermined rotational direction due to the generated magnetomotive force. At this time, since the generated magnetomotive force distributed in the two-stage stepped chevron shape similar to the sine wave is formed in the rotor 5 in the same manner as mentioned above, the rotor 5 reacts to the electric current flowing to the stator coil 41 and the start operation of the synchronous induction motor 2A is executed.

Further, because the three-phase sine wave alternating current (the three-phase alternating commercial power source AC) is applied to the stator coil 41 so as to rotate the rotor 5 due to the magnetomotive force generated by the permanent magnet 31, it is possible to execute the self start in the same manner as that of the conventional synchronous induction motor. Further, at a time of the operation, it is possible to execute a synchronous operation due to the magnetomotive force generated by the permanent magnet 31 inserted to the rotor 5.

As mentioned above, the three-phase two-pole synchronous induction motor 2A also makes the generated magnetomotive force corresponding to one pole of the permanent magnet 31 inserted to the rotor 5 equal to or less than 10% of the peak value in the range of the electrical angle between 0 degree and 10 degrees and between 170 degrees and 180 degrees in the same manner as mentioned above, and the generated magnetomotive force in the range of the electrical angle between 10 degrees and 170 degrees is distributed in the step shape so as to be concentrated in the sine wave shape. Accordingly, as well as the single-phase two-poles synchronous induction motor 2, in the three-phase two-pole synchronous induction motor 2A, it is possible to effectively make good use of the reluctance torque so as to restrict the rotational torque unevenness of the rotor 5 and it is possible to largely increase a preferable output property (a pullout torque). Accordingly, it is possible to operate the synchronous induction motor 2A at a high efficiency and at a high torque.

In this case, in the embodiment, the structure is made such that the one-pole permanent magnet 31 in one side of the rotor 5 is constituted by two permanent magnets 31SA and 31SB and the one-pole permanent magnet 31 in another side is constituted by two permanent magnets 31NA and 31NB, however, the structure is not limited to this, and even when plural sheets of permanent magnets 31 are provided in one pole of one side in the rotor 5 and plural sheets of permanent magnets 31 are provided in one pole of another side, thereby distributing the generated magnetomotive force in the ranges of the electrical angle between 10 degrees and 170 degrees and between 190 degrees and 350 degrees in a step shape having two stages or more and further making it similar to the sine wave shape, the present invention is effective.

As described in detail above, in accordance with the present invention, since in the synchronous induction motor having the stator provided with the stator winding, the rotor rotating within the stator, the cage-type secondary electric conductor provided in the peripheral portion of the rotor yoke portion constituting the rotor, and the permanent magnet inserted into the rotor yoke portion and having the two-pole structure, the magnetomotive force generated by one pole of the rotor is set to the value equal to or less than 10% of a peak value in the predetermined range near the electrical angle 0 degree or 180 degrees, it is possible to concentrate the magnetomotive force generated by the rotor to a range between 10 degrees and 170 degrees which corresponds to a range other than the electrical angles 0–10 degrees and 170–180 degrees by setting the range equal to or less than 10% the electrical angles 0–10 degrees and 170–180 degrees. Accordingly, since it is possible to secure a great reluctance torque, it is possible to achieve a high efficiency and a high torque of the synchronous induction motor.

Further, in accordance with the present invention, in addition to the above, since the magnetomotive forces generated by the rotor in the other range of the electrical angle than the range equal to or less than 10% are distributed in a sine wave shape, it is possible to smoothly rotate the rotor. Accordingly, it is possible to make good use of a reluctance torque.

Further, when the magnetomotive forces generated by the rotor in the other range of the electrical angle than the range equal to or less than 10% are distributed in a step-like chevron shape having two steps or more, it is possible to make the magnetomotive force generated by the rotor having the permanent magnet having the two-pole structure inserted into the rotor yoke portion similar to a sine wave. Accordingly, it is possible to achieve a high efficiency and a high torque without largely deteriorating an effect of the magnetomotive force generated by the rotor.

In particular, if the generated magnetomotive force is, for example, formed in the shape distributed in a step-like chevron shape having two steps or more, it is possible to further improve an effectiveness of a high efficiency and a high torque.

Further, in accordance with the present invention, since the synchronous induction motor mentioned above is mounted on the compressor, it is possible to realize a low energy structure, for example, by using the compressor in the air conditioning device or the electric refrigerator. Accordingly, it is possible to develop a commercial product, for example, corresponding to a recent energy regulation or the like.

What is claimed is:

1. A synchronous induction motor comprising:
a stator provided with a stator winding;
a rotor rotating within said stator;
a cage-type secondary electric conductor provided in a peripheral portion of a rotor yoke portion constituting said rotor; and
a permanent magnet inserted into the rotor yoke portion and having a two-pole structure,
wherein the magnetomotive force generated by one pole of said rotor is set to a value equal to or less than 10% of a peak value in a predetermined range at a non-continuous portion of a waveform of the magnetomotive force near an electrical angle of 0 degrees or 180 degrees, and
wherein the magnetomotive forces generated by said rotor in a range of the electrical angle other than said range equal to or less than 10% are distributed in a sine wave shape.

2. A synchronous induction motor comprising:
a stator provided with a stator winding;
a rotor rotating within said stator;
a cage-type secondary electric conductor provided in a peripheral portion of a rotor yoke portion constituting said rotor; and
a permanent magnet inserted into the rotor yoke portion and having a two-pole structure,
wherein the magnetomotive force generated by one pole of said rotor is set to a value equal to or less than 10% of a peak value in a predetermined range at a non-continuous portion of a waveform of the magnetomotive force near an electrical angle of 0 degrees or 180 degrees, and
wherein the magnetomotive forces generated by said rotor in a range of the electrical angle other than said range equal to or less than 10% are distributed in a step-like chevron shape having two or more steps.

3. A synchronous induction motor as claimed in claim 1 or claim 2, wherein said range equal to or less than 10% is set to electrical angles of 0–10 degrees and 170–180 degrees.

4. A synchronous induction motor as claimed in claim 1 or claim 2, wherein the synchronous induction motor is mounted on a compressor.

5. A synchronous induction motor as claimed in claim 4, wherein the compressor is used in an air conditioning device or an electric refrigerator.

* * * * *